United States Patent [19]

Chaum

[11] Patent Number: 4,529,870
[45] Date of Patent: Jul. 16, 1985

[54] CRYPTOGRAPHIC IDENTIFICATION, FINANCIAL TRANSACTION, AND CREDENTIAL DEVICE

[76] Inventor: David Chaum, 14652 Sutton St., Sherman Oaks, Calif. 91403

[21] Appl. No.: 392,271

[22] Filed: Jun. 25, 1982

Related U.S. Application Data

[63] Continuation of Ser. No. 129,173, Mar. 10, 1980, abandoned.

[51] Int. Cl.³ .............................................. G06K 5/00
[52] U.S. Cl. .................................. 235/380; 235/379; 235/381
[58] Field of Search ........................ 235/379, 380, 381

[56] References Cited

U.S. PATENT DOCUMENTS

| | | | |
|---|---|---|---|
| 3,859,508 | 1/1975 | Broson | 235/380 |
| 3,875,375 | 4/1975 | Scuitto | 235/380 |
| 3,906,201 | 9/1975 | Housman | 235/380 |
| 3,946,202 | 3/1976 | Taniguchi | 235/380 |
| 4,048,475 | 9/1977 | Yoshida | 235/380 |
| 4,179,686 | 12/1979 | Bonicalzi | 235/380 |
| 4,193,131 | 3/1980 | Lennon | 340/825.34 |
| 4,198,619 | 4/1980 | Atalla | 235/380 |
| 4,271,482 | 6/1981 | Giraud | 235/380 |
| 4,277,837 | 7/1981 | Stuckert | 235/380 X |
| 4,315,101 | 2/1982 | Atalla | 235/379 |
| 4,317,957 | 3/1982 | Sendrow | 235/379 |
| 4,321,672 | 3/1982 | Braun | 235/379 |
| 4,349,695 | 9/1982 | Morgan | 340/825.34 |

*Primary Examiner*—Harold I. Pitts
*Attorney, Agent, or Firm*—Spensley Horn Jubas & Lubitz

[57] ABSTRACT

The invention provides a cryptographic apparatus which may be "personalized" to its owner. The apparatus may be utilized by its owner to identify himself to an external computer system, to perform various financial transactions with an external system, and to provide various kinds of credentials to an external system. The apparatus, in one embodiment, is separable into a cryptographic device, packaged in a tamper resistant housing, and a personal terminal device. The cryptographic device includes interface circuitry to permit information exchange with the external system, a memory device for storage of data necessary to allow identification of the owner, and control logic for controlling the exchange of data with the external system to identify the owner. Certain data which must be utilized to perform the identification information exchange is stored in the memory device in encrypted form. The decryption of this data requires the entry of a secret ID, known to the owner.

The personal terminal device includes a data entry capability to allow the owner to enter his secret ID. Certain embodiments of the personal terminal device include data display capability to provide transaction information to the owner. Other embodiments include memory devices and a processor to allow storage and manipulation of relatively unsecured data of the owner.

21 Claims, 6 Drawing Figures

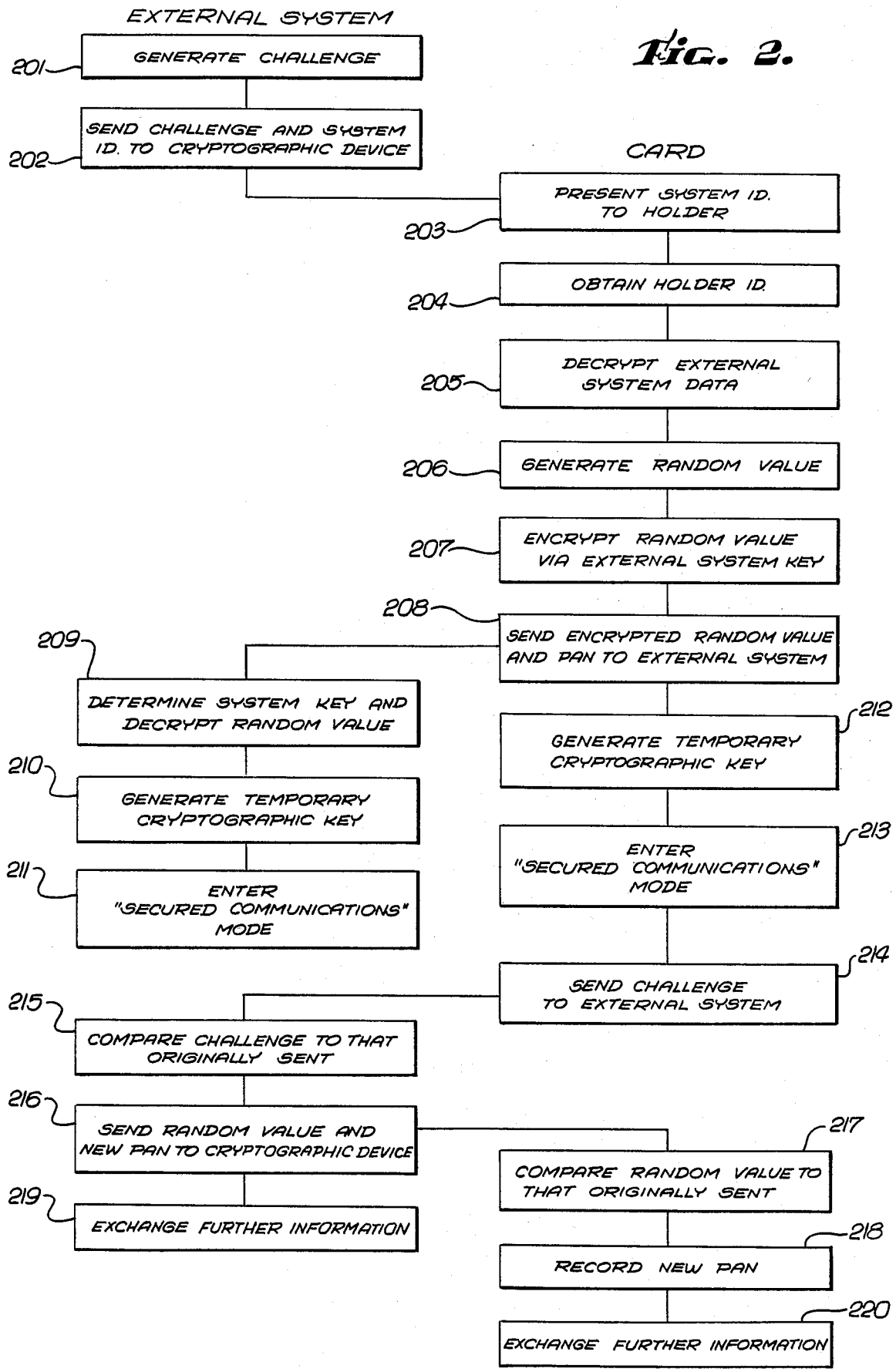

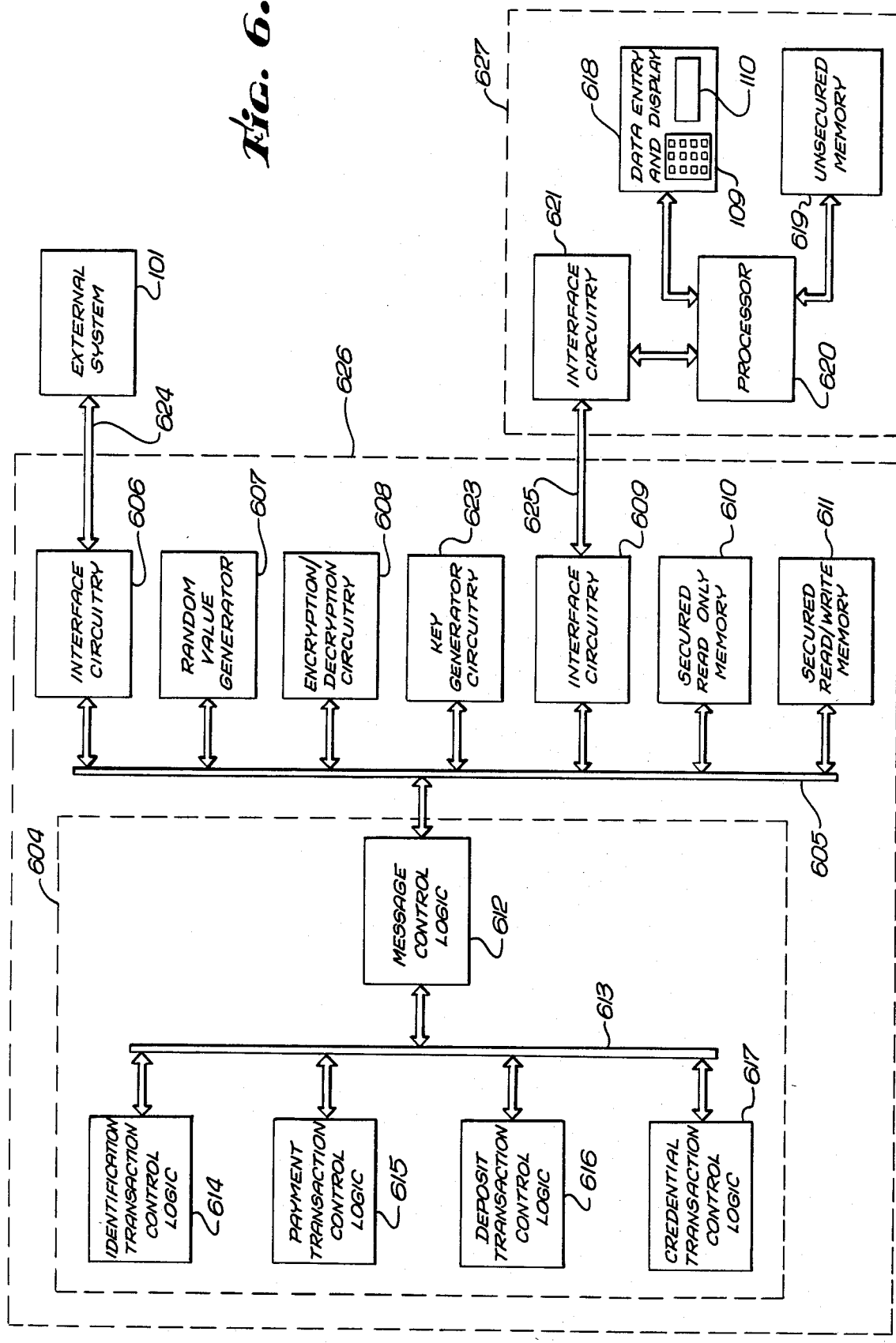

CRYPTOGRAPHIC IDENTIFICATION, FINANCIAL TRANSACTION, AND CREDENTIAL DEVICE

This is a continuation of application Ser. No. 129,173, filed 3/10/80 now abandoned.

BACKGROUND OF THE INVENTION

1. Field of the Invention

This invention relates to a small, portable credit card like device for assisting its owner in identifying himself to an external system, for cryptographically securing communication between its owner and the external system, for performing financial transactions in cooperation with the external system, and for providing credentials to the external system.

2. Prior Art

Society has developed several methods to allow its members to identify themselves to each other and to conveniently perform financial transactions. Identification methods have included issuance of documents such as driver's licenses, passports, bank cards, etc. Financial transactions may be performed via use of currency, checks, credit cards, and various electronic funds transfer schemes.

Each of these methods of identification or performing financial transactions has numerous disadvantages. For instance, one of the primary factors that discourages the use of currency is the possibility of theft. Additionally, certain types of cash transactions may require presentation of credential documents. For instance, in connection with the purchase of alcoholic beverages, submission of a document establishing proof of age is often required. In certain countries, conversion of one country's currency into another's requires proof of citizenship such as that obtained from a passport.

Inasmuch as a check is easily forged, payment by check usually requires submission to the payee of identification documents such as a driver's license. Additionally, every check is microfilmed by the band maintaining the corresponding checking account. Accordingly, the transaction details recorded on the check, which include payee, amount paid, and data of the transaction, are available to the banking industry, to governmental bodies, and possibly to other third parties to the original transaction, creating the possibility for covert invasion of privacy.

Another disadvantage with checks is that often a merchant will refuse to accept a check from a bank distant from him. Such refusal is usually based upon the difficulty he has in ascertaining whether a check drawn on a distant bank will be honored. On the other hand, a check has the advantage that the individual must provide his signature on the actual instrument, certifying his approval of the unalterable transaction record.

The use of stolen credit cards has been a substantial problem. Verification of credit card number validity and current credit limits has been an inconvenient process for merchants to perform, and therefore is often neglected. Another problem with credit cards is that illegal use may be made of a credit card account if the card number is obtained, such as may be done by retrieving discarded receipts, or merely by memorization of the number by an onlooker. Another disadvantage with credit cards is that, unlike cash or checks, exchanges between individuals are difficult to perform via credit cards.

Electronic funds transfer systems (EFTS) typically do not require the user's signature on an instrument to perform a payment transaction. Rather, the user's secret personal identification number (PIN) and plastic card are entered into a point-of-sale terminal located on a merchant's premise. Once the PIN and data recorded on the card have been supplied by the user to the terminal, he is at the mercy of the terminal and associated system to properly record the details of the transaction. Additionally, if the security of the EFTS is breached, the PIN and card number may be obtained by others, who may then perform unauthorized transactions. Like checks or credit cards, and EFTS has the same disadvantage of allowing covert records to be maintained on a person's financial transactions.

Accordingly, it is an object of the herein disclosed invention to provide a small, forgery resistant card-like device which is 'personalized' so that only its proper owner may utilize it. The owner may identify himself via the device to an external system, such as a merchant's point-of-sale terminal or financial institution's EFTS, only after the device is itself enabled by entry of an ID known only to its owner. It is a further object to provide in such a device a general computer processing and data storage capability which the owner may utilize to maintain various personal and financial data. Another object of the invention is to allow convenient and secure display of selected transaction details to the card owner, and to allow convenient and secure entry of data, authorization codes, and other information by the owner. An additional object of the invention is to allow the device to provide cryptographically secure storage of data concerning accounts the owner may maintain with various financial institutions, such data being modifiable only upon proper authorization by the appropriate financial institution and the owner.

Another object of the invention is to permit use of any of a variety of standard cryptographic algorithms, such as the National Data Encryption Standard algorithm (DES) or various "public key" algorithms, to secure certain confidential data stored in the device and to secure communications between the device and an external system, such securing to be performed without the necessity of transmitting over a communications link sufficient information to enable an eavesdropper to itself determined the cryptographic key in use or the identity of the card owner.

It is a further object of the invention to provide a device able to selectively present a specific credential concerning its owner, without releasing other unrelated information. Another object of the invention is to provide a device which will assist in the performance of a financial transaction, yet secure the transactions details against covert inspection. A further object of the invention is to eliminate the possibility that the equivalent of a bad check will be offered or that a line of credit will be exceeded. Yet another object of the invention is to allow transactions to be conveniently conducted between individuals. An additional object is to provide a device which obviates the need for assignment of a universal identification number to a person for use with various organizations.

SUMMARY OF THE INVENTION

These and other objects of the herein disclosed invention are provided for by a small, tamper resistant device containing electronic circuitry providing means for identification of the owner of the device to an external system and the subsequent cryptographic securing of further communication between the device and the external system.

The device includes circuitry for interfacing via a communications link to external systems such as a merchant's point-of-sale terminal or a financial institution's online system. Additional circuitry is provided to generate random values as required upon request by a cryptographic key generator circuit. The key generator circuit generates a unique temporary cryptographic key, ensuring that communications between the device and external system are cryptographically protected by the temporary one-use key. Read only and read/write memory is provided to store data on various financial accounts of the owner and to maintain unalterable credential information provided the device by suitable authorities. The devide is personalized to its owner by the securing of certain data stored in the device's memory by encryption to insure that only the owner may utilize that data. The data stored in the device's memory includes credential information data, data on various financial accounts, and cryptographic key data. Encryption/decryption circuitry is provided to secure communications between the device and an external system. In one embodiment, the device may be physically separable into a tamper resistant cyptographic device and a terminal device. The terminal device may include data display and entry circuitry, allowing convenient use of the inventive device by its owner.

The inventive device may include means for identification of its owner to an external system and vice versa, with the resultant generation of a unique temporary cryptographic key for use in the performance of subsequent transactions. These transactions may include making a payment to the external system from one of his accounts, making a deposit to an account, or presenting a credential to a third party.

BRIEF DESCRIPTION OF THE DRAWINGS

FIG. 2 is a process flow chart summarizing the major processing steps implemented in one embodiment of the inventive device to perform an identification transaction process.

FIG. 6 is an electronic block diagram schematic of one embodiment of the inventive device.

DETAILED DESCRIPTION OF THE PREFERRED EMBODIMENTS

Figure 1:
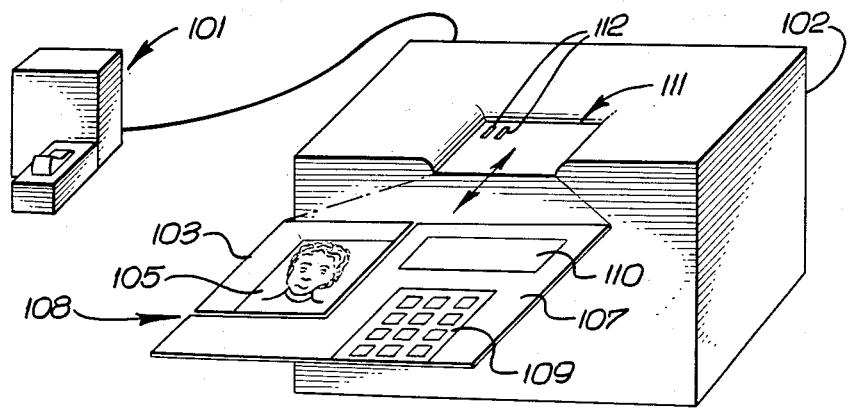
FIG. 1 is a perspective view of one embodiment of the inventive identification and financial transaction device showing how it may be physically and electrically connected to an external system.

The herein disclosed invention provides for a personal identification and transaction device 108, an embodiment of which is portrayed in FIG. 1. In this embodiment, the device 108, hereafter "card", is configured as a small, portable, card-like unit which may be readily carried by an individual as though it were a credit card or "credit card" calculator, as are now commercially available.

The card 108 is utilized to allow identification of its owner to an external system 101, such as a bank's online financial account system or a merchant's point-of-sale system. Typically such an external system 101 requires satisfactory completion of an identification process by a prospective user before further utilization of the system by the user. The card 108 is personalized so that it may be readily utilized by its owner to identify himself to such an external system 101, yet may not be utilized by another to perform the necessary identification process with the external system 101. In one embodiment, the "personalization" of a card is provided by encryption of certain data within the card 108 which may be decrypted only via use of a secret key or ID known to the owner of the card.

The particular design of the external system 101 is not critical to the invention, but for illustrative purposes FIG. 1 shows the external system 101 as including an associated interface unit 102. The interface unit 102 provides means for conveniently interfacing the external system 101 to the inventive card 108. Although FIG. 1 suggests that the interface unit 102 is physically separable from the external system 101, certain external systems 101 may include an integral interface unit. For instance, another card may serve as an external system or a merchant's stand alone point-of-sale terminal may not maintain an online communications link to a host processor, but may rather record the details of transactions being performed during the course of a day for later batch processing. Whatever the design of the external system 101, provision will be made for the exchange of information between it and the card 108.

The interface unit 102 of FIG. 1 includes a receptacle 111 on the interface unit 102 suitable to mechanically engage the card 108 when provided by its holder. The receptacle 111 includes means for electrically connecting the interface unit 102 to the card 108, such as electrical contacts 112. Other means for creating this information transfer connection may include an optical connection, radio connection, inductive or capacitive connection, etc. Of course in the case of some interconnection means, such as radio or telephone, there may be no mechanical contact between the card 108 and the interface unit 102. The invention should not be limited to a particular means for bringing the card 108 into communication with the external system 101 inasmuch as any of the methods known in the industry for providing such an information transfer capability would be suitable for use in the invention. Although not illustrated in FIG. 1, the card 108 would include corresponding connection means for interfacing the card 108 to the connection means 112 of the interface unit 102.

The embodiment of the invention illustrated in FIG. 1 provides for a separable card 108 having a cryptographic device 103 connected to a terminal device 107. The cryptographic device 103 is housed in a tamper resistant package such as that formed by an epoxy potting process or by plastic lamination. Such a package is to prevent the unauthorized modification, inspection, or forgery of the cryptographic device 103. The cryptographic device 103 may include a photograph 105 or other image of the card owner. The photograph 105 is useful to allow visual verification by another that the holder of the card 108 is the owner of the card. Not visible in FIG. 1 are various processing means and storage means in the card 108, discussed below.

The embodiment of FIG. 1 allows for the physical separation of the subassemblies of the card 108 which must be secured against forgery, tampering, or unauthorized inspection from the other subassemblies of the card 108, such as those providing data entry and display capabilities, which need not be included in a tamper resistant package. The elements of the card 108 requiring physical securing are collected into a cryptographic device 103, whereas the other elements may be collected into a terminal device 107.

The terminal device 107 may include data entry means, such as a keyboard 109, for accepting data from a holder of the card 108. For instance the data entry key board 108 may be utilized by a holder of the card to enter a proported owner ID for decrypting data stored in the cryptographic device 103. In addition, the terminal device 107 may include data display means, such as a LED or LCD alphanumeric display panel 110, for presenting information to the card holder, such as a request for the secret key known to the card owner. Although not visible in FIG. 1, the terminal device 107 may include various electronic processing and storage means for providing the card holder with calculator capabilities, for storage and processing of data of the card owner, etc.

Although it is possible for the card owner to utilize "public" data display and/or entry devices, such as a merchant's point-of-sale terminal, to enter his secret ID, an advantage to having the owner provide his own terminal device 107 is that he can be better assured that such confidential data as his ID will be be improperly retained by the data entry device, or that the device will display improper information, inasmuch as he maintains control and possession over the terminal device 107.

Of course, if the owner is confident that a public data entry terminal will not improperly retain or utilize data entered into it, or display improper information, such a terminal may be utilized without departing from the teachings of the invention.

The inventive card 108, need not be physically separable into a cryptographic device 103 and terminal device 107 inasmuch as any or all of the modules included in the terminal device 107 may equally be included in the tamper resistant housing of the cryptographic device 103. Although for purposes of clarity, the card 108 will be referred to as having a cryptographic device 103 and terminal device 107, such terminology should not be interpreted to limit the scope of the invention to a two-part card 108 inasmuch as all or part of the functions of the terminal device 107 can be provided as part of the external system's interface unit 102 or they may be included in the tamper resistant unitary housing of the cryptographic device 103.

In one embodiment, the card 108 is configured to perform four major transaction processes between an external system 101 and an owner of the inventive device 108:

1. Identification. This transaction serves to identify the owner of the card 108 to an external system 101, to "unlock" certain previously secured data in the cryptographic device 103 associated with the relationship the owner maintains with the external system 101, and to generate a unique cryptographic key usable by the external system 101 and card 108 for securing further communications between them.
2. Payment. This transaction, which may be preceeded by an identification exchange, debits an account balance maintained in the cryptographic device 103 and generates forgery and tamper resistant transaction details suitable to allow transfer of the debited amount to another's account.
3. Deposit. This transaction allows modification by an external system of secured data stored within the cryptographic device 103 such as the current balance of an account maintained by the owner of the card with that external system.
4. Credential. This transaction provides a process by which the owner of the card 108 may cause the card 108 to provide certain credential information concerning the owner, such as birth date, which is maintained in the card 108. A visual check by the person requesting the credential with the photograph 105 of the device's authorized owner will allow a credential check of the card owner holder without the necessity for providing additional identification, such as his name, address, or information on his financial accounts.

The inventive card 108 can be readily extended to provide means for participating in numerous other information exchange processes, such as credit card or other payment type transactions, in which a financial institution extends credit on an account rather than immediately debits the account. In addition, once the identification process is successfully completed, the external system and the card owner may exchange via the terminal device 107 whatever data or messages are desired. Such may be accomplished by any of several methods known in the industry, such as by including in such messages or data a flag indicating that, except for the necessary encryption/decryption by the cryptographic device 103, no further processing need be or has been performed by the cryptographic device 103. In such a mode of operation, the cryptographic device would maintain a cryptographically secured communications link between the external system 101 and the terminal device 107, without otherwise processing the information being exchanged.

A more detailed discussion of embodiments of the four major transaction processes is provided below.

FIG. 6 is an electrical block diagram of one embodiment of the electrical circuitry utilizable in the inventive card 108.

The cryptographic device circuitry 626 interfaces to the external system 101 via a communication link 624, as may be provided via the previously discussed interface unit 102; the cryptographic device circuitry 626 also interfaces to the terminal device circuitry 627 via communications link 625.

In the embodiment portrayed in FIG. 6, a central data and control bus 605 is utilized by various circuit modules of the cryptographic device 103 to provide a standard means for passing data signals and control signals between the various circuit modules of the cryptographic device 103. It may be appreciated by those skilled in the art that such a bus structure is not critical to the nature of the invention inasmuch as there are numerous conventional alternatives to such a circuit organization. Additionally, of course, the circuitry of the inventive cryptographic device 103 may be collected into a programmed semiconductor microprocesser device, with associated semiconductor support devices. The capabilities of such a microprocessor may allow the basic functions of the device to be distributed in a manner different from that portrayed in FIG. 6, depending on the particular distribution of capabilities of the devices in the microprocessor device family. Additionally, as is becoming more common in the industry for high production consumer items, special integrated circuitry may be readily designed to provide in hardware the desired individual functions of the card 108. Those skilled in the art will appreciate that from the herein provided disclosure of the invention, commerical semiconductor integrated circuit technology would suggest numerous alternatives for actual implementation of the inventive card's circuitry 626, 627 without departing from the teachings of the invention.

In the embodiment of the cryptographic device's circuitry 626 illustrated in FIG. 6, interface circuitry 606 is provided to reformat certain data signals on the bus 605 for transmission via communications link 624 to the external system 101. Additionally, the interface circuitry 606 reformats data signals received via the communications link 624 from the external system 101 as necessary to forward them via the bus 605 to the control logic circuitry 604 and other circuit modules connected to the bus 605. Inasmuch as any of a variety of types of communications links 624 between the cryptographic device 103 and external system 101 may be utilized, the means for interfacing the card's bus 605 to the communications link 624 would depend upon the specific nature of the communications link 624. For instance, if the communications link 624 is via direct electical contact between the interface circuitry 606 and external system 101, such as illustrated in FIG. 1 with the electrical connections 112 on the interface unit 102, the interface circuitry 606 may include appropriate line drivers and isolation elements to insure proper electrical protection of the cryptographic device 103. If the communications link 624 is optical, LED or other light generating devices and photocells or other light sensing devices may be appropriately utilized. As is well known in the art, means for interfacing a data bus 605 and a particular type of communications link 624 may be provided via standard well known electrical circuitry, and may even be provided in a semiconductor integrated circuit device.

Interface circuitry 609 provides means for transmitting data signals via communications link 625 between the terminal device circuitry 627 and the cryptographic device circuitry 626. Depending on the nature of the communications link 625, and the signal conventions utilized with the data bus 605, standard interface circuitry 609 may be provided.

In order to allow the cryptographic device 103 to vary in an unpredictable way the generation of temporary cryptographic keys, a random value generator 607 is provided. This random value generator 607 may be attached to the bus 605. It provides, upon request, either a truly random or apparently random, i.e. "pseudorandom", value. Circuitry for providing such random number generation capability are well known in the art. For instance, a circuit utilizing a "noisy" diode may provide true random values, as is well known in the industry. Random appearing values may be provided by a pseudorandom number generator circuit which implements a mathematical algorithm, such as the power-residue algorithm, that, although deterministic, generates apparently random values from a "seed" number. The use of clocks or counters provides another often used source of random data. Cryptographic techniques may also be applied to advantage in the generation of random values.

In order to secure information being exchanged between the cryptographic device 103 and the external system 101, encryption/decryption circuitry 608 is provided. This circuitry provides means for encryption of information by use of a specified key for forwarding via the interface circuitry 606 to the external system 101. Similarly, upon specification of the appropriate key, the encryption/decryption circuitry 608 may decrypt messages received via the interface circuitry 606 from the external system 101. Th encryption/decryption circuitry 608 may also be used to encrypt and decrypt data stored in the secured memories 610, 611, or information received from or transmitted to the terminal device 107.

Although the encryption/decryption circuitry 608 is shown in FIG. 6 as connecting to the bus 605, in alternative embodiments, interface circuitry 606 and encryption/decryption circuitry 608 may be combined, providing for the simultaneous encryption/decryption and formating of data signals between the bus 605 and the external system 101.

The encryption/decryption algorithm utilized by the inventive device 103 may be any of the well known algorithms, such as the DES algorithm, or "trapdoor" public key algorithms. Inasmuch as the details of the particular cryptographic algorithm utilized by the cryptographic device 103 and external system 101 are not critical to the invention, the teachings of the invention should not be limited to use with any particular cryptographic algorithm.

Due to the increasing interest in providing cryptographically secured communications, various manufacturers are providing semiconductor integrated circuit devices which perform the encryption and decryption of data. Such devices are widely utilized to implement the DES algorithm, due to the federally mandated use of that algorithm. Western Digital Corporation's WD2001 and WD2002 data encryption devices are examples of suitable commerically available encryption/decryption circuitry 608.

As will be described in more detail below, the inventive cryptographic device 103 includes means for generation of a temporary cryptographic key usable by the encryption/decryption circuitry 608. This temporary key is generated after the card 108 has been connected to the external system 101, and is utilized only so long as the card 108 remains connected. Each time the card 103 is connected to an external system 101, a new temporary cryptographic key can be generated by the key generation circuitry 623 from various parameters supplied it via the bus 605. Depending on the type of algorithm implemented by the encryption/decryption circuitry 608, an appropriate key generation circuit 623 may be provided. For instance, in one embodiment the binary representation of the parameters to be utilized in generating a new temporary key are exclusive-ORed (also known as bit wise addition modulo two) together to provide the binary representation of the new temporary key. Other embodiments encrypt a mathematical combination of the key generation parameters, with the resulting encrypted value being utilized as the new temporary key. The possible parameters able to be utilized by the generation circuit 623 are discussed in detail below.

The cryptographic device 103 also includes means for storage and retrieval of various data 610, 611. Certain data utilized by the card 108 need only be read, never being modified during use of the card. Such means for storage retrieval are most appropriately implemented with one or more read only memory (ROM) devices 610, as are widely available in the industry. The data stored in the ROM memory 610 may include credential information, discussed below, which may be provided by some authority, such as a governmental agency, for use to substantiate that the card owner has certain privileges, for instance that he or she is permitted to buy alcoholic beverages. Such credential information could be stored in the ROM memory 610 by the appropriate authority, thereby preventing its alteration.

Other data stored in the cryptographic device 103 would be capable of modification. For such classes of data a read/write memory device 611, such as is commonly available in the industry in RAM integrated circuit devices is provided to allow storage and retrieval of the data.

For maximum security of the data stored in the provided memory devices 610, 611, the data is preferably stored in encrypted form. Unless a holder of the card could provide the necessary decryption key, such data maintained in the memory devices 610, 611 would be secure against unauthorized inspection or utilization. In one embodiment of the cryptographic device 103, the card owner has a secret ID which, when provided to the cryptographic device 103, may be used by the encryption/decryption circuitry 608 to decrypt data stored in the memories 610, 611. This is one way the card 108 can be "personalized" so that only its proper owner may use it. Another way the card 108 may be personalized is to store the owner ID in the provided memory devices 610, 611, and configure the control logic 604 to compare an entered ID with the stored ID. If they do not match, the control logic 604 may refuse to accept another entry for a period of time.

An alternate approach is to have the memory devices 601, 611 store an encrypted constant (such as all zeros), using the ID as the decryption key. A purported ID would be used to decrypt this stored data, and would be recognized as correct if it yielded the original constant. An advantage to this approach is that if the card were to fall into the wrong hands, and the contents of memories 610, 611 were to become known, the ID would not be directly revealed. But if the ID is short, it might be guessed, and the guess verified by using it to perform the decryption and checking for the constant. Of course use of the ID to encrypt other data that has some structure that can be recognized has the same problem.

A solution to this problem that may be used with at least some of the possible plurality of owner ID's is to encrypt only data with no recognizeable structure, such as key data or data that can only be decrypted with keys that are not present in the memories 610, 611. If certain data should be available only upon authorization of a particular external system, in addition to encryion of that data via the owner ID, it may be again encrypted (i.e., a double encryption) with a secret key that the external system supplies as necessary to retrieve or modify such data.

Also connected to the bus 605 is a control logic circuitry 604 which coordinates and controls the various other circuit modules as necessary to implement certain transaction processes, as discussed below. As may be understood by those skilled in the art, such control logic circuitry 604 may be implemented as hardwired digital logic incorporating for example NAND gate devices, timer devices, counters, flip-flops, etc. Alternatively, the control logic circuitry 604 may be implemented by the widely known techniques involving a control store and associated logic circuitry.

The control logic circuitry 604 may be divided into several major circuit modules. Message control logic 612 provides the general coordination of data and control signals on the bus 605 between the various previously described circuit modules. After the cryptographic device 103 is linked to an external system 101, the message control logic 612 determines from information received from either the external system 101 or terminal device 107 the type of transaction desired to be performed by the card holder.

It is anticipated that four major classes of transaction may be performed by the inventive card 103. These may include, as previously discussed, identification transactions, payment transactions, deposit transactions, or credential transactions. Other transactions may be readily implemented in the control logic circuitry 604. However for purposes of detailed discussion, the circuit embodiment illustrated in FIG. 6 portrays the control logic circuitry 604 as comprising identification transaction control logic 614, payment transaction control logic 615, deposit transaction control logic 616, and credential transaction control logic 617. Other transaction control logic may be included in the control logic circuitry 604 as necessary to implement other transaction processes.

Although the control logic circuitry 604 may be described in terms of detailed hardware schematics, the control functions are best illustrated by use of process flow charts. Detailed description of the transaction processes and associated control logic functions are described below for each of the four major transaction processes.

The capabilities of the terminal device 107 may be implemented as part of the cryptographic device 103 if desired. However, as mentioned earlier, the functions of the terminal device 107—i.e., storage of data which need not be secured from the user, the performance of general processing functions, and the ability to display data to or accept data from the card holder—need not be implemented in the cryptographic device 103. If these functions are implemented in a separate terminal device 107, then it may be desirable for the personal terminal to be permanently personalized to the cryptographic device 103 or user so as to discourage the nuisance that may be caused by a market for stolen personal terminal devices 107.

Such considerations may be relevant since it is anticipated that users may have a plurality of terminal devices 107 for use on various occasions, some of which may be portable, and some of which may be shared.

If implemented in a separate terminal device 107, corresponding interface circuitry 621 would be provided in the terminal 107 to allow maintenance of the communications link 625 between the cryptographic device 103 and terminal device 107. A suitable processor device 620 would be provided to perform the desired information storage and processing functions. Suitable means for entry of data by the holder, e.g. a keyboard 109, may be provided in the terminal device 107. Additionally if it is desired to display certain information to the holder, for example identification data from an external system 101 or the details concerning a particular transaction, a means for display of data, such as an LED or LCD display panel 110 would be provided. Means for storage of data 619 may also be provided. Such means could be provided by any of the widely available memory integrated circuit devices 619 or such other storage means available in the industry.

While it may be possible to incorporate functions that need not be secured from the user into the cryptographic device 103 as has been mentioned, it is also possible for some data that is stored in the terminal device to be in encrypted form, and thereby resist tampering by the user.

The Identification Transaction Process

The identification transaction process allows an external system 101 to identify a person seeking to communicate with it who holds a card 108 personalized to him. Prior art identification processes have often been based on the assignment of a "universal" identification number, such as a social security number or driver's license number, to each person. The number is then widely used for identification of the person. One practical problem with such a process is that an external system who receives such a universal identification number during the course of one transaction could then use it to impersonate the person to others. Another problem with such universal identification numbers used in the prior art is that it becomes easy to trace the movements and transactions of an individual.

One solution to these problems is for the inventive cryptographic device 103 to store in a secured manner a plurality of numbers, each one designating to an associated external system the owner of the card or an account he maintains with the external system. It will be convenient to call such a number a Personal Authentication Number or PAN.

Utilization of a different PAN for each such external system or account does not avoid all of the problems inherent in universal identification numbers. For instance, if the communication link 624 between the cryptographic device 102 and a particular external system 101 is monitored by a third party, the eavesdropper could determine the PAN used by an individual to identify himself to that particular external system, and could later use the PAN to impersonate the individual to the same external system. The inventive cryptographic device 103 solves this problem by providing an identification process wherein both the cryptographic device 103 and the external system 101 utilize secret information which is never transmitted over a communications link between them during an identification process. Further, the inventive identification process has the important property that neither the external system 101 nor cryptographic device 103 can be replaced by a playback of a previous transaction without being detected by the other. In addition, the inventive identification process provides the ability for an external system to privately transmit a new PAN in encrypted form to the card 103 each time the old one is used, thereby making it impossible for an eavesdropper on the communication link 624 to determine a valid PAN, or to trace the movement of a particular individual.

It may also be desirable, as mentioned earlier, to use an owner ID to encrypt only data whose structure is unrecognizable, such as key data. This can readily be achieved in the identification transaction by using the ID only to encrypt the aforementioned secret information that the card 108 and the external system 101 have in common. A further refinement allows this secret information to be changed each time after it is used, so that even the information obtained by an eavesdropper cannot be used to check a guessed ID.

It is desirable but not essential that a unique key be generated each time an identification transaction is performed so that a card 103 which is stolen while it is in secured communication mode contains only this temporary key in unencrypted form.

In one embodiment such properties are provided by a cryptographic device 103 having control circuitry implementing an identification process in which both the external system and cryptographic device 103 independently generate random values, which are then exchanged and used to generate a temporary cryptographic key for use in that one series of information exchanges. Upon disconnection of the card 108 from the interface unit receptacle 111, the temporary key is discarded. Of course similar immunity to playbacks could be created, without the use or advantages of a temporary key. For example, using the random values as non-secret parameters to the cryptosystem (such as the initial fill of the cipher feedback mode of the DES) or as plaintext in a chaining arrangement. The cryptographic device 103 includes a random value generator 607, which may generate pseudorandom numbers by utilization of a counter, real-time clock, or any pseudorandom number generation algorithm known in the art; alternatively it may generate true random numbers via a noisy diode circuit or any such similar technique. Although it is not essential that the random value be hard to predict, the use of such values has several advantages, such as not unnecessarily revealing information to the external system about the card's 108 use history, or simplifying key generation and data exchangers requirred to detect playback attempts.

The identification transaction has a wide variety of uses. For example, it might be used to allow the card owner to gain entry to some protected container or area by means of an automated unlocking device and an external system that controls it, both within the protected space. Such an external system might have means to destroy the system key in case of forced entry so that although the legitimate user could gain access by using the PAN; he would be altered because the identification process could not be completed. Another use would be for activating or deactivating an alarm mechanism. Still other uses relate to the need for individuals to identify themselves for medical, law enforcement or other legal purposes. Yet other uses are related to the need for authorization over the phone or other remote authorizations such as an individual might wish to make to some organization within which he has some relationship. Still other uses are related to the general need to enter into cryptographically secured communications.

FIG. 2 diagrammatically portrays an identification transaction process implemented in one embodiment of the control circuitry 604 of the cryptographic device 103. In the left hand column are the processes primarily performed by the external system 101, whereas in the right hand column are processes primarily performed by the card 108, particularly the cryptographic device 103, under control of the identification transaction control logic 614.

After the external system 101 and cryptographic device 103 have established a communications link 624 between them, the external system 101, as indicated in process block 201, may generate "challenge" data, which will be used by the external system 101 to ensure that the identification process is uniquely different from other identification transactions in which it has participated. This property allows the external system 101 to be assured that the card 108 is not merely "playing back" an earlier identification transaction. As previously discussed in conjunction with the random value generator circuit 607, such challenge data may be formed by the external system 101 by utilization of any of a variety of circuits well known in the art.

Associated with each external system 101 is a system ID, which is publicly known and serves to identify the external syystem to the cryptographic device 103 and card owner. The manner in which system IDs are assigned to external systems is not important to the invention, and it is assumed that various organizations such as financial institutions may mutually agree on a unique assignment of system ID's to external systems. As indicated in process block 202, the external system 101 then provides the cryptographic device 103, via the communications link 624, its system ID and the challenge data which it has generated for use with this particular identification transaction.

As indicated in process block 203 and 204, the cryptographic device 103 may prevent to its holder the system ID provided it or other equivalent information in order to allow the holder to verify that he is identifying himself to the desired external system. If the holder decides to authorize continuation of the identification process, he must provide to the cryptographic device 103 the secret owner ID.

The card 108 may provide the system ID to its holder by any one of a variety of means, such as forwarding the information to the terminal device 107 which has data display capability. Alternatively, such data display capability may be incorporated into the tamper resistant housing of the cryptographic device 103.

The cryptographic device 103 maintains in encrypted form certain data which is keyed to the external system ID. This data may include the PAN, which had been earlier assigned by the external system to the owner of the card and is stored in the card. The PAN provides a means for uniquely identifying the card owner or his associated account to the external system 101. Also stored in the cryptographic device 103 is a secret external system cyptographic key, known to the external system and accessible by it from its internal data via the PAN. The system key need never be transmitted across the communications link 624 since both the cyprotographic device 013 and external system 101 have access to it. This insures that an eavesdropper will be unable to ascertain the system key by monitoring the communications link 624.

The external system cyrptographic key is preferably unique to each external system, and for maximum security, the external system would determine a different system key for each PAN. In fact if an external system were to form PAN by encrypting the desired system key (along with possibly some other data) with a master key, the external system could recover the system key corresponding to a PAN submitted to it simply by decrypting the PAN with the master key. The system key could be stored in the cryptographic device 103 upon the opening of a new accound with the external system 101.

As indicated in process block 205, once the cryptographic device 103 has obtained the card owner's authorization to complete the identification process and his secret owner ID, the owner ID is used by the encryption/decryption circuitry 608 to decrypt the system key associated with the external system maintained in the secured memories 610, 611 of the cryptographic device 103. The external system data stored in the cryptographic device 103 is preferably maintained in an encrypted form so that unless the owner ID is available to the cryptographic device 103, a third part may not access or recover the encrypted data.

As indicated in process block 206 of FIG. 2, the random value generator 607 generates an apparently random value, muck like the external system 101 did in preparing the challenge data. This random value is encrypted by the encryption/decryption circuitry 608 via the system key, as indicated in process block 207. Although this encryption is not essential, it has the advantage of increasing the amount of secret information that the card 108 and external system 101 have in common and can use in the subsequent generation of new keys. As discussed below, the random value will be utilized by the key generation circuitry 623 to generate a new temporary cryptographic key which will be used to secure communications between the external system 101 and cryptographic device 103. After generating the random value and encrypting it by use of the system key, the interface circuitry 606 reformats it as necessary and forwards it to the external system 101 via the communications link 624 along with the PAN that the external system had previously assigned to the card owner or his account, as described in process block 208.

Upon receiving this information, the external system 101 may determine the secret system key associated with that PAN, and thereby decrypt the random value received from the cryptographic device 103 (process block 209).

As indicated in process blocks 210 and 212, the external system 101 and the key generation circuitry 623 of the cryptographic device 103 then generate a new temporary cryptographic key unique to this identification process. The key is generated by a previously agreed upon algorithm from data known to both the external system 101 and the key generation circuitry 623 of the cryptographic device 103. This data may include the challenge (originally generated by the external system and unique to this identification process), the system key, and/or the random value originally generated in the cryptographic device 103. In order to insure that the resultant key is unique to the identification process, either the challenge or random value should be incorporated as a parameter in the key generation algorithm. Optimally, both may be utilized in generating the cryptographic key.

There are numerous well known methods for generating a new cryptographic key for use with a particular encryption/decryption algorithm. Where, as here several parameters may be incorporated into the key generation algorithm, a simple exclusive-ORing of the binary representations of the parameter values may be used to compress them to a size suitable for use in whatever key generation algorithm is utilized.

As mentioned earlier, it may sometimes be desirable to change the system key at this point. This new key may be generated independently by the card 108 and the external system 101 in much the same way as the temporary key was generated. Alternatively, of course, one of either the card 108 or external system 101 might generate the new key and supply it in encrypted form to the other.

After operation of the temporary cryptographic key by both the external system 101 and cryptographic device 103, they each enter into a "secured communications" mode 211, 213. Further communications between the external system 101 and cryptographic device 103 are encrypted by the transmitter utilizing the temporary key and decrypted by the receiver.

Of couse, both the external system and card must have previously agreed upon a particular cryptographic algorithm for use with the generated temporary key.

Upon entering the second communications mode, the cryptographic device 103 and external system 101 may exchange some information (encrypted now of cource since all communications are secured) to allow each to determine that the other has generated the appropriate temporary key, and is not an impostor or playback. Such exchanges may be unnecessary when substantial amounts of information that contain redundancy which is checked for are exchanged once communications become secured. But in cases where no information will be exchanged, such as in the typical identifications of an individual to an access control device, the exchanges discussed below are desirable. Also new PAN may be transmitted at this time to provide greater protection from eavesdropping as mentioned earlier. An additional function that may be perfoormed is the transmission of a key from the external system 101 to the card 108 that in combination with the ID will allow the card to access data stored in its memories 610, 611, 619.

The cryptographic device 103 may return the challenge to the external system 101, as indicated in process block 214. Upon receiving the returned challenge, the external system compares it to that originally transmitted to the card, as noted in process block 215. This comparison permits the external system to verify that the cryptographic device 103 has properly generated the temporary cryptographic key, and that it is not merely playing back a previously monitored identification transaction.

As indicated in process block 216, the external system 101 may transmit to the cryptographic device 103 the original random value supplied it by the cryptographic device 103 (as shown in process block 208) and also a new PAN. Upon receiving these items the cryptographic device 103 will check that the correct random value was returned, as noted in process block 217. Once this check has been satisfied, the cryptographic device 103 will change the PAN recorded in the secured memory 611 to the new PAN as indicated in process block 218. The identification process is now complete.

Further financial transactions and information exchanges may now be performed between the external system 101 and the cryptographic device 103 via the secured communications link 624, as indicated in process block 219 and 220. Subsequent transactions may include the payment, deposit, and credential transaction processes to be discussed in more detail below.

Numerous variations and rearrangements of the teachings of this inventive identification process may be developed without departing from the spirit of the invention. For instance, the temporary cryptographic key generated in process block 210 and 212, may be maintained by the external system 101 and cryptographic device 103 for subsequent use as a key generation parameter in the next identification process to form the new temporary cryptographic key for that subsequent identification process. Such a variation would serve to complicate the key generation process inasmuch as a particular temporary cryptographic key would be the result of a series of earlier key generation processes.

The Payment Transaction Process

Another transaction process which may be provided by the card 108 is one in which a payment from a financial account of the card's owner may be made to another. Such a payment may be accomplished by the exchange of information between the card 108 and an external system 101 such as a merchant or another card 108. The card may be utilized as part of a system that requires a merchant, before completing a payment transaction, to communicate with other entities (e.g., financial institutions or credit agencies) for approval of the transaction. Alternatively, the card 108 may be utilized in a stand alone system which, by its design, does not require a merchant to receive approval of the transaction. A system which does not require third party approval, however, can easily be adapted to use third party approval, and has several advantages. Transactions are less costly to perform; therefore such a system is better suited for use with small transactions. Additionally such systems are more convenient for inter-individual transactions, and more robust in the face of a failure of a remote approval system.

In such a stand along system, the cryptographic device 103 will provide the external system 101 with information, which will be referred to as a check, that will allow the external system to receive payment from the financial institution maintaining the account to be debited.

A check may be as simple as an individual's account number and amount to be paid. Such a check format has many of the problems of the prior art. An improvement would be to use a unique number for each check. This would eliminate the possibility that the external system could make additional undetected fradulent transactions using the number, or that it could identify the individual making payment. Of course such a check number must be constructed so that it is difficult to derive additional check numbers from it.

During a payment transaction the external system 101 may provide the cryptographic device 103 additional information. In addition to the amount to be paid, this information might include such things as a description of the items being bought, information that constitutes a receipt for payment, and some identification of the payee. Such additional information will be referred to as the description portion of a check.

Check numbers may be formed by combining the bank's number, the checking account number, and the serial number for the check in any ordinary way. Another approach would be for the bank maintaining an account to encrypt the account number and check serial numbers with a cryptographic key it never divulges and then forward the encrypted numbers to a clearinghouse, which would combine them with the bank number and encrypt this combination using a key that it never divulges. The doubly encrypted numbers could then be stored in the card 108 for later use.

Such a doubly encrypted check number would reveal nothing to anyone except the clearinghouse, which may decrypt it, and forward the result to the appropriate bank. Upon receiving such a number the bank could decrypt it and determine the account and serial number involved.

Another approach would be for the bank to encrypt the check numbers individually, using its secret key, and supply them to the card 108 by, for example, including them in some message.

Figure 3:
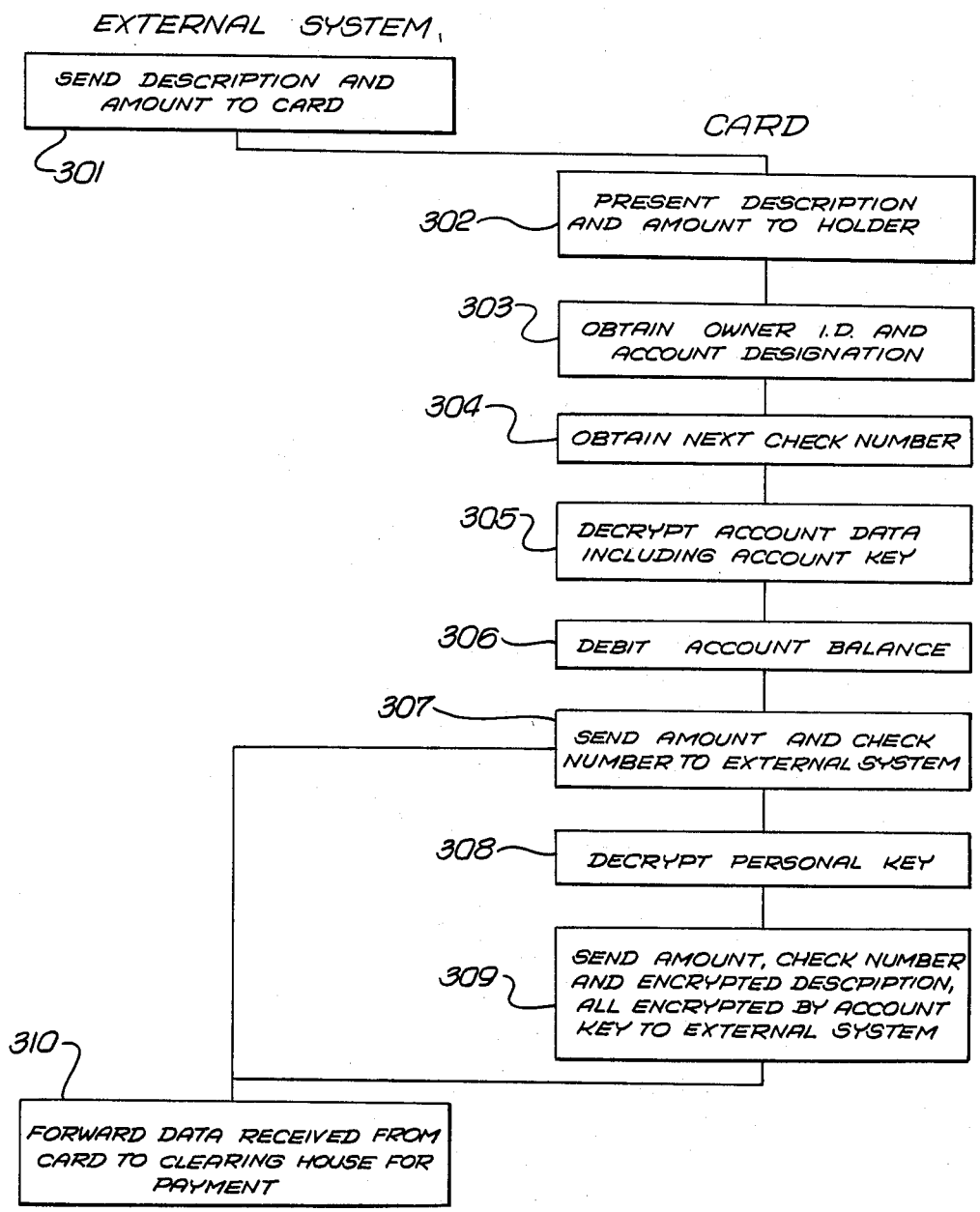
FIG. 3 is a process flow chart summarizing the major processing steps implemented in one embodiment of the inventive device to perform a payment transaction process.

FIG. 3 is a process flow chart of one implementation of a payment transaction process able to be provided by the inventive card 108. First an external system 101, such as a merchant's point-of-sale terminal, and the inventive card 108 are brought into communication with each other. Then the external system 101, as indicated in process block 301, provides the cryptographic device 103 with a description of the transaction to be performed, including the amount of payment required. The card 108, after receiving this information, presents it to its holder, as indicated in process block 302, to allow the holder to verify the nature of the transaction to be performed, and to authorize the transaction.

If the holder approves of the transaction, the card then obtains from the holder the secret owner ID and a designation of the account to be debited, as indicated in process block 303. For instance, the card 108 may maintain information on accounts with several financial institutions, and the card owner may select the appropriate account from which payment should be made.

After obtaining the account designation and owner ID, the cryptographic device 103 obtains the check number to be assigned to the transaction, as indicated in process block 304. As discussed earlier, the check numbers may be provided by the card owner as required, or a list of check numbers for each account may be maintained in any of the memories 610, 611, 619 of the card 108 for use as required.

For each account which may be debited as a result of a payment transaction, the card 108 maintains certain data. This data includes an account designation which was specified by the card owner as indicated in process block 303. The account data also inclues a confidential account key, originally provided by the financial institution maintaining the particular account, and the current balance of the account. As previously mentioned, in addition to this information, the data concerning a checking account may also include a list of check number for use in the payment transaction. This account data is retrievable by the account designation, and is stored with the possible exception of the check numbers and balances, in encrypted form in the secured memories 610, 611 of the cryptographic device 103. In order to decrypt encrypted account information, it must be decrypted by the secret owner ID. As previously mentioned, since the account data is preferably stored in encrypted form, in the event that a third party obtains the card 108 and is able to inspect the contents of the cryptographic device's memories 610, 611, the account data would be protected from unauthorized inspection unless the owner ID were available to the third party.

Accordingly, as indicated in process block 305, after obtaining the owner ID and a designation of the account to be debited, the account data is decrypted by the encryption/decryption circuitry 608 by use of the owner ID, making available the account key and account balance. The account balance is then decreased by the amount originally stated by the external system 101, as indicated in process block 306. If the account balance becomes negative, and the account is not a credit type account in which the financial institution maintaining the account is willing to extend credit to the holder when the account is overdrawn, the payment transaction is terminated at that point.

In one embodiment, when a payment transaction attempts to overdraw an account, the card owner is so informed, allowing him to designate an alternative account for debiting. In this manner, the card owner is not embarrassed due to a temporary or accidental overdrawing of a particular financial account.

After debiting of the account balance, the new balance is encrypted by the encryption/decryption circuitry 608 and stored in the read/write memory device 611 of the cryptographic device 103.

As indicated in process block 307, the cryptographic device 103 may then send the external system 101, via the interface circuitry 606, the amount of payment and the check number assigned to the payment transaction. This information may be sufficient to allow an authorization decision to be made by an online system.

If the card owner wishes to insure that the transaction description provided by the external system 101 remains confidential, it may be encrypted via a secret personal key. This personal key may be stored in encrypted form in the memories 610, 611 of the cryptographic device 103, and may be decrypted only upon obtaining the owner ID. Inasmuch as neither the merchant, the financial institution maintaining the account being debited, clearinghouses processing the payment transaction, nor any other third party need have access to the card owner's personal key, any information encrypted via use of this key will be able to be decrypted only by one having access to the card and to the owner ID (process block 308). Of course, copies or parts of the personal key may be distributed to trusted agents to allow its reconstruction after loss or destruction of the card 108. Accordingly, to insure privacy of the description of the transaction, the description may be encrypted via this personal key.

As indicated in process block 309, the cryptographic device 103 may provide the amount to be debited, check number, and encrypted description, all three items encrypted by the account key, to the external system 101. This information will allow the financial institution maintaining the account, to decrypt the check and the amount to be debited, and process the transactions. The financial institution may maintain the check description in encrypted form for the card owner's later reference.

After receiving the information indicated in process blocks 307 and 309, from the cryptographic device 103, the external system 101, as indicated in process block 310, may forward it to a central clearinghouse for crediting to its account. As previously discussed, from the check number the clearinghouse may determine the financial institution maintaining the account to be debited, and forward the information to it for final processing.

The Deposit Transaction Process

The deposit transaction process allows an owner of the inventive card 108 to have the current balance of a particular account maintained by the card 108 increased by the appropriate financial institution, allowing continued payments transactions to be made by the card owner. Typically this transaction will be performed in the secured communications mode which may be entered into by an external system 101 and cryptographic device 103 during an identification transaction. This secured communication mode insures that the information exchanged between the external system 101 and cryptographic device 103 during a deposit transaction will be secured against possible eavesdroppers. Unlike the payments transaction in which the external system 101 would generally be a merchant or other card 108, the external system 101 participating in a deposit transaction will typically be the financial institution which maintains the card owner's account whose balance is to be modified.

Figure 4:
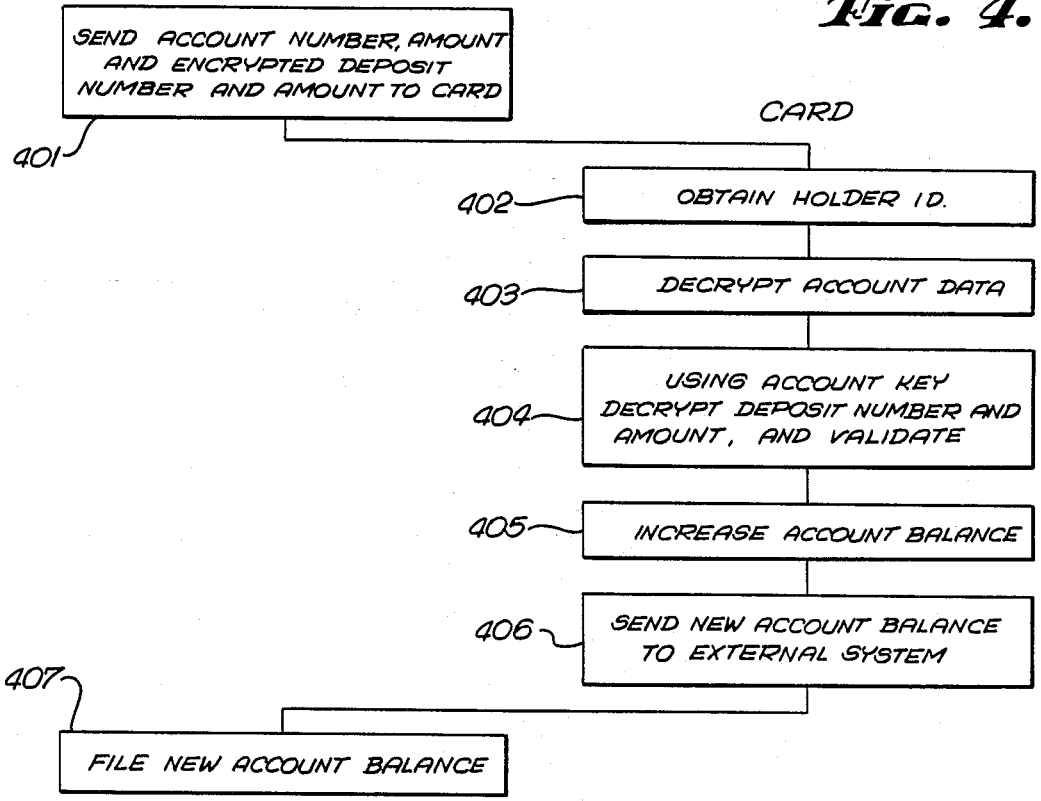
FIG. 4 is a process flow chart summarizing the major processing steps implemented in one embodiment of the inventive device to perform a deposit transaction process.

As indicated in process block 401 of FIG. 4, the external system 101, i.e., the financial institution maintaining the account to which a deposit is to be made, forwards via communication link 624 to the cryptographic device 103 the appropriate account number, amount to be deposited, and a deposit number and second copy of the amount, which have both been encrypted via the appropriate account key.

As previously discussed in the context of other transaction processes, the personal terminal 107 is a suitable means for presenting the authority ID and credential type to the card owner and for allowing entry of the owner ID.

After obtaining this information, the card 108 presents (via the terminal device 107 or other such data display device) the details of the transaction to the card holder for his authorization, and receives, as indicated in process block 402, the secret owner ID. As previously discussed, after the cryptographic device 103 obtains the owner ID, it may decrypt the account data maintained in its memories 610, 611, as indicated in process block 403. This data includes the account key, current account balance, and an expected deposit number. By use of the account key, the encrypted deposit number and amount, as received from the external system 101 in process block 401, are decrypted and compared against the expected deposit number and unencrypted amount, as indicated in process block 404. If the expected deposit number does not correspond to the one received or the two amounts are not identical, then the deposit transaction is terminated inasmuch as the records of the card 108 and the external system 101 do not correspond, or a possible fraud attempt is indicated.

Assuming a match between the expected deposit number and received deposit number and the amounts, the deposit number is incremented and encrypted by the encryption/decryption circuitry 608. It is then stored in the read/write memory 611 as the expected deposit number to be supplied by the external system 101 in the next deposit transaction concerning that account. Additionally, as indicated in process block 405, the account balance is increased by the amount specified by the external system 101 in process block 401, and the new account balance is stored in the read/write memory 611. As indicated in process block 406, the new account balance is then forwarded to the external system 101 for verification. The external system 101 stores this new account balance in its associated file for the account, as indicated in process block 407.

The net effect of this transaction is to provide an increased account balance in the records maintained by the card, allowing the card owner to perform additional payment transactions.

The Credential Transaction Process

The credential transaction process is used by a card owner to present certain credential type data concerning himself to another. Examples of such data can be found in the automation of various prior art documents such as birth certificates, drivers licenses, passports, social security cards, check guarantee cards, insurance cards, membership cards, passes, and tickets of all sorts. Further examples include data that can be used to identify an individual such as fingerprint data, and speech or handwriting recognition data. An additional example is data that can allow the card 108 itself to be authenticated, such as that disclosed in U.S. Pat. No. 3,636,618.

One disadvantage with present document credentials such as a passport or driver's license, is that they usually contain information beyond that necessary to authenticate the credential. For instance, when a driver's license is submitted to a merchant to establish birth data, the name and address of the credential owner, as well as personal data such as whether he must wear corrective lenses is provided to the merchant. The credential transaction process of the inventive card 108 allows for selective and limited presentation of credential information by the card owner.

Figure 5:
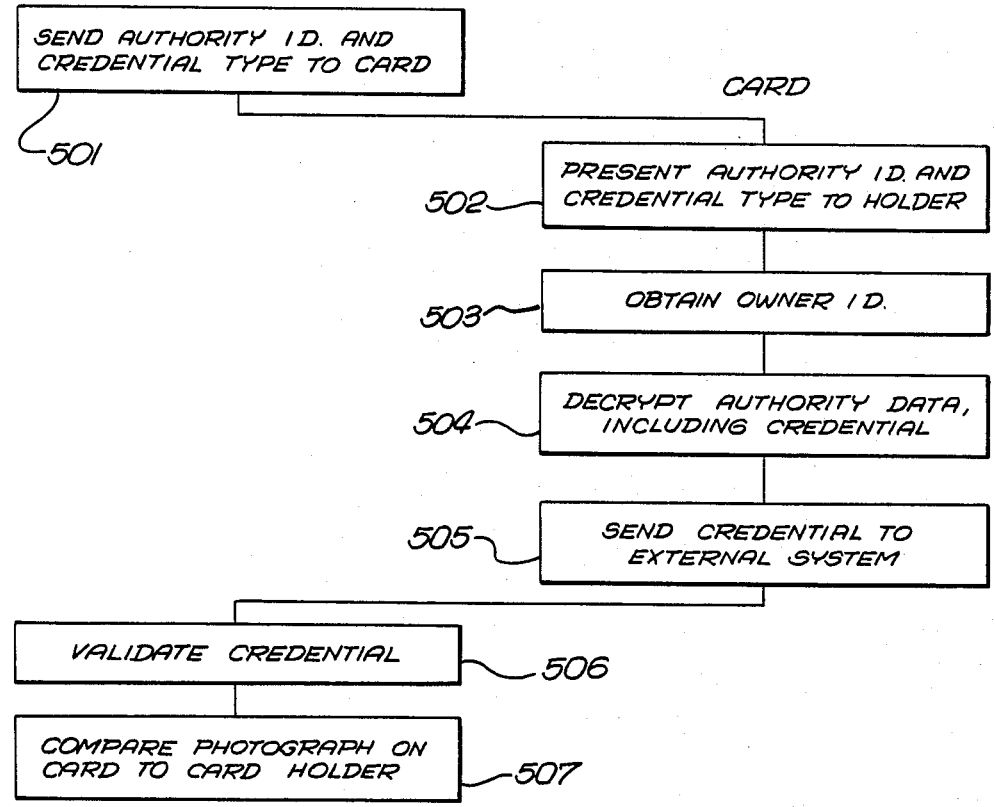
FIG. 5 is a process flow chart summarizing the major processing steps implemented in one embodiment of the inventive device to perform a credential transaction process.

FIG. 5 is a process flow chart summarizing the major processing steps which may be implemented by the control logic 617 of the card 108. In this process flow chart it is assumed that the card 108 has been provided credential information at an earlier time by the appropriate issuing authority.

The credential information may be stored in the unsecured memory 619 of the personal terminal 107. If stored in the personal terminal's memory 619, it would be stored in encrypted forms. Typically, it would be encrypted via an authority key originally supplied the cryptographic device 103 by the issuing authority. This authority key would be accessible from the memories 610, 611 of the cryptographic device 103 when an appropriate authority ID is specified.

As indicated in process block 501 of FIG. 5, the external system 101 desiring receipt of the credential information will provide the cryptographic device 103 the ID of the issuing authority and a specification as to the type of credential desired. The cryptographic device's control logic 604, upon recognizing that credential information is to be provided the external system 101, presents the details of the transaction to the card owner, as indicated in process block 502. It is expected that the card owner will require the authority ID and credential type in order to determine exactly which credential he is being required to submit. If the card owner desires to authorize the submission of the desired credential to the external system 101, he provides the cryptograhic device 103 with the secret owner ID, as indicated in process block 503.

As previously discussed in the context of other transaction processes, the personal terminal 107 is a suitable means for presenting the authority ID and credential type to the card owner and for allowing entry of the owner ID.

The cryptographic device 103, upon obtaining the authority owner ID, decrypts the authority data stored in the memories 610, 611 of the cryptographic device 103, as indicated in process block 504. This data would include the credential information which has been requested to be supplied to the external system 101. In another embodiment, as mentioned above, the credential information may be stored in the memory device 619 of the personal terminal 107. However, before storage, it would be encrypted via a secret authority key previously supplied the cryptographic device 103 by the issuing authority. In such an embodiment the personal terminal 107 would supply the cryptographic device 103 with the encrypted credential information. Then the cryptographic device 103 would obtain the associated authority key from its memories 610, 611 and decrypt the credential information received from the personal terminal 107.

As indicated in process block 505, the cryptographic device 103 then provides the selected credential to the external system 101. The external system 101 then determines whether the supplied credential is the desired credential, as indicated in process block 506. In addition, the external system may wish to determine that the owner of the card 108 is the one actually holding the card 108 at the time the credential information was submitted to the external system 101. As indicated in process block 507, this may be done by comparing the photograph 105—which is included in and is visible through the tamper resistant housing of the cryptographic device 103—with the card holder.

Public Key Cryptography

The DES algorithm is well suited for use in the inventive card 108 inasmuch as a key used to encrypt data via the algorithm may also be used to decrypt the encrypted data. Other cryptographic algorithms may not have this property, yet they are equally suitable for use in the card 108. As an illustration of this, the following comments on the "trap door" public key algorithm disclosed by Rivest, Shamir, and Adleman in "A Method for Obtaining Digital Signatures and Public Key Cryptosystems," *Communications of the Association for Computing Machinery,* Volume 21, number 2, February 1978, pages 120–126 will illustrate the suitability of such an algorithm in the card.

In public key algorithms, a pair of associated keys is derived from a suitable randomly generated number known as a seed. One member of the pair is called the public key, and can usually be made known to anyone who cares to know it. The other member of the pair of keys is called the private key, and it is kept confidential. The two keys are said to correspond to one another, and they are inverses of one another in the sense that data encrypted using one can only be decrypted by using the other.

Every system key, authority key, and account key may be composed of two parts. The first part will be a private key that is unique to the particular cryptographic device 103. The associated public key will be included in a PAN or will otherwise be made accessible to the external system. The second part of each of these keys will be the public key of the external system, authority, or account. Many cards may share these same public keys, but only the external system will have the corresponding private key. It is well known in the art how such a two part key is used to encrypt and to decrypt data. Some data is encrypted or decrypted by first applying the public key algorithm using the first part of the key, and then applying the algorithm on the result using the second part of the key.

The personal key may also be divided into two parts. Both parts would be derived from the same seed, so that they would be inverses of each other. Only the first part of the personal key is used with the public key algorithm while encrypting data. Such data would be decrypted (in the case of examining descriptions retained by a financial institution) by using the second part of the personal key.

The DES algorithm may be used to decrypt keys stored in the cryptographic device 103, using the owner ID as a key. The same function can be performed using public key algorithms. The keys would be encrypted by using the public key of a pair, and the owner ID would be used to derive the private key that would allow their decryption. Since users may wish to choose their owner IDs, and the public key corresponding to a particular private key may be difficult to find, what is needed is a way to derive a given private key from an arbitrarily chosen owner ID.

An example of a simple but effective way to achieve this result is for the desired owner ID to be exclusive-ORed with the desired private key, and for the resulting string of bits to be saved in the cryptographic device read/write memory 611. When the owner ID is provided to the cryptographic device 103 during some transaction it is exclusive-ORed with this saved string of bits, and the result is the private key that can be used to decrypt other data. The saved data leaves no clue as to the owner ID, or private key. A similar approach may also be used with the DES algorithm to allow an owner ID to be changed without reencrypting all the data encrypted using the owner ID.

The final use made of the DES involved the generation of temporary keys and new system keys in the identification transaction. In a public key scheme, all that would have to be generated is a new private key for the first part of the temporary (system) key used by the card 108, and a corresponding public key to be used for the second part of the external system's temporary (system) key. The external system's public key could safely be used as the second part of the temporary (system) key by the card 108; the corresponding private key could safely be used as the first part of the temporary (system) key by the external system 101. The necessary keys could be obtained for example by the card 108 and the external system 101 each generating the same pair of keys (process blocks 210 and 212) and then each discarding the member of the pair that they have no use for.

The use of public key algorithms has a number of advantages. Whereas if the DES algorithm is used and a third party determines the plaintext contained in the secured memories 610, 611, he could forge credentials and deposit transactions. Similarly, if someone breached the security of an external system's files then he could use this information to impersonate any card owner to the external system. Such abuses are not possible with the public key algorithm. Public key cryptography can also be used to extend the possible applications where, as mentioned earlier, the data encrypted using an ID is unrecognizable for purposes of checking a guessed ID. For example, if the public key is not otherwise generally available, and only the private key is encrypted with a particular ID, then various other data may safely be contained in the memories 610, 611, 619 or otherwise made available, provided it is first combined with unpredictable random data and then encrypted using the private key.

Another advantage of the public key algorithm is that it provides so called digital signatures or third party authentication. Such information is "signed" by encrypting it with a private key. Anyone can check the signature by decrypting with the corresponding public key and checking for some suitable redundance such as parity bits. When the public key algorithm is used, all the information exchanged between an external system and a cryptographic device in the secured communications mode are "signed" by the originator, in that the information has been encrypted with the originator's private key. If the recipient were to retain a copy of such encrypted information, it could allow anyone knowing the public key of the information's originator to verify the signature and thus authenticate the message. This might be useful in the case where someone denies having sent a particular message.

Digital signatures can also be used to limit the kinds of abuses that could be caused by an altered or counterfeit cryptographic device. If a cryptographic device supplies someone with a credential that bears the digital signature of the authority that originally issued the credential, then the requestor can check the signature and be assured that the credential was really created by that particular authority, even if the requestor does not trust the cryptographic device 103. With the public key algorithm, the digital signature of the issuing authority can be left intact if the credential received is decrypted using only the first part of the issuing authority's key. The same effect, however, can be created by a cryptographic device 103 that doesn't use public key cryptography at all. The fact that a credential bears a digital signature could be quite transparent to a cryptographic device which treats it merely as a string of bits. One previously mentioned type of credential data for which signed credentials might be particularly useful is that which can be used to authenticate the card 108 itself.

Just as a card 108 may present signed credentials whether it uses public key cryptography or not, so can it issue signed check numbers in either case. If check numbers were signed by a clearinghouse, a merchant could verify the signature on a check number and be assured that it is in fact an authentic check number. If an expiration date is included within the signed check number, the merchant could also assure himself that the check number is not obsolete. Merchants might still be concerned that the number was stolen from say another merchant, or that the unencrypted amount of the check claimed by the cryptographic device (process block 307) differs from the encrypted amount (process block 309).

The cryptographic device 103 may include control logic to solve these problems in the following way. The signed check numbers already discussed will be augmented to include a public key, just as they may include an expiration date. The private key that corresponds to such a public key in a check number need only be available to the cryptographic device. The cryptographic device 103 may use this private key to sign the amount along with the check number, and the merchant can verify the signature using the public key found in the check number.

Digital signatures can also be used to provide third party authentication in other situations. For example, the check description forwarded by a merchant (process block 301) in a payment transaction could be signed by the merchant, and might then serve as a more useful proof of purchase.

While only a limited number of embodiments of the disclosed invention have been discussed herein, it will be readily apparent to persons skilled in the art that certain changes and modifications may be made without departing from the spirit of the invention. Accordingly, the foregoing disclosure, description, and figures are for illustrative purposes only, and do not in any way limit the invention, which is defined only by the claims.

I claim:

1. A personal, portable two-part terminal and personal ID device, for electronically securely communicating between an operator having a predetermined personal ID and electronic external system having a communications interface with means for receiving and transmitting information and having data processing means, comprising:
   (a) a terminal device comprising:
      (1) a display means for selectively displaying information to the operator;
      (2) keyboard data entry means for entering transaction information from the operator;
      (3) a personal ID device interface means for coupling the terminal device to a personal ID device, said interface means having receiving and transmitting means for transferring information between the terminal device and the personal ID device; and
      (4) control means, coupled to the personal ID interface means, the keyboard data entry means, and the display means, for transmitting and receiving information through the personal ID device interface means, for displaying on the display means received information, and for receiving information from the operator through the keyboard data entry means for transmission through the personal ID device interface means to the personal ID device and for display on the display means;
   (b) the personal ID device coupled to the terminal device comprising:
      (1) an external system interface means for coupling the personal ID device to the communications interface of the external system, said interface means having receiving and transmitting means for transferring information between the personal ID device and the external system;
      (2) a terminal interface means for coupling the personal ID device to the personal ID device interface means of the terminal device, said terminal interface means having receiving and transmitting means for transferring information between the personal ID device and the external system;
      (3) data storage means for at least temporarily storing selected information encrypted using the personal ID of the operator as a key;
      (4) data security means, including a random number generator means and a cryptographic key generator means, for encrypting and decrypting selected information using a selected key;
      (5) processing means, coupled to the external system interface means, the terminal interface means, the data security means, and the data storage means, for controlling in a predetermined manner the exchange of information between the personal ID device and the external system through the external system interface, for controlling the exchange of information between the personal ID device and the terminal device through the terminal interface means, for receiving the operator's personal ID through the data entry means in approval of a transaction, and for decrypting selected information from the storage means with the data security means using the personal ID as a key; and
      (5) a tamper-resistant housing enclosing at least the processing means, the data security means, and data storage means.

2. The two-part terminal and personal ID device of claim 1 wherein the terminal device is separable from the personal ID device.

3. The two-part terminal and personal ID device of claim 1, wherein the external system interface means of the personal ID device is configured to couple the terminal and personal ID device to the external system interface means of a second terminal and personal ID device to permit information exchange therebetween.

4. For use with an external electronic system requiring receipt of identification information to identify an authorized operator before use of the system, each authorized operator having a predetermined personal ID, the external system having a communication interface with means for receiving and transmitting information, data processing means, and data storage means having stored therein a system ID and a system key, a portable personal ID device comprising:
  (a) an interface means having receiving and transmitting means for transferring information, for coupling the personal ID device to the communications interface of the external system to permit information exchange therebetween;
  (b) keyboard data entry means for accepting the personal ID and transaction information from the operator;
  (c) display means for selectively displaying information to the operator;
  (d) data storage means having stored therein, and encrypted by the personal ID as a key, a predetermined system key and a predetermined personal authentication number;
  (e) processing means coupled to the interface means, the data entry means, the display means, and the data storage means, for receiving a first random number and the system ID from the external system, for displaying the system ID on the display means to the user for operator verification that the system is one with which the operator desires to exchange information, for receiving the operator personal ID through the data entry means in approval of the transaction, for decrypting the system key and the personal authentication number using the personal ID as a key, for generating a second random number, for encrypting the second random number using the system key as a key, for transmitting the encrypted second random number and the decrypted personal authentication number from the personal ID device to the external system, for generating a temporary cryptographic session key using a predetermined combination of the first random number, the second random number, and the system key, and for using the temporary session key to encrypt and decrypt information thereafter exchanged between the personal ID device and the external system; and
  (f) a tamper-resistant housing enclosing at least the processing means and data storage means.

5. A method for transmitting data in a secure manner between an authorized user and an external electronic system, the external system having data processing means, a plurality of predetermined system keys each having an associated personal authentication number, comprising the steps of:
  (a) providing a personal ID device comprising:
    (1) an interface means for coupling the personal ID device to the external system to permit information exchange therebetween, (2) data storage means having stored therein data including a predetermined system key and its associated personal authentication number, (3) processing means coupled to the interface means and the data storage means, for controlling the function of the personal ID card, and (4) a tamper-resistant housing enclosing at least the processing means and data storage means;
  (b) connecting the personal ID device to the external system through the interface means;
  (c) transmitting a challenge number from the external system to the storage means of the personal ID device;
  (d) accessing the system key and the personal authentication number from the storage means with the processing means;
  (e) generating a random number in the personal ID device with the processing means;
  (f) encrypting the random number with the processing means, using the system key as a key;
  (g) transmitting the encrypted random number and the decrypted personal authentication number from the personal ID device to the external system;
  (h) selecting in the external system the system key having an associated personal authentication number matching the received personal authentication number;
  (i) decrypting and storing the random number in the external system, using the selected system key as a key;
  (j) generating a temporary cryptographic session key in the external system, using a predetermined combination of the challenge number, the random number, and the system key as a key;
  (k) generating the same temporary session key with the processing means of the personal ID device, using a predetermined combination of the challenge number, the random number, and the system key as a key; and
  (l) using the temporary session key to encrypt and decrypt data thereafter exchanged between the personal ID device and the external system.

6. A method for transmitting data in a secure manner between an authorized user and an external electronic system, the external system having data processing means and a master key, comprising the steps of:
  (a) providing a personal ID device comprising:
    (1) an interface means for coupling the personal ID device to the external system to permit information exchange therebetween, (2) data storage means having stored therein data including a predetermined system key and a predetermined personal authentication number, the personal authentication number comprising the system key encrypted using the master key as a key, (3) processing means coupled to the interface means and the data storage means, for controlling the function of the personal ID card, and (4) a tamper-resistant housing enclosing at least the processing means and data storage means;
  (b) connecting the personal ID device to the external system through the interface means;
  (c) transmitting a first random number from the external system to the storage means of the personal ID device;
  (d) accessing the system key and the personal authentication number from the storage means with the processing means;
  (e) generating a second random number in the personal ID device with the processing means;

(f) encrypting the second random number with the processing means, using the system key as a key;

(g) transmitting the encrypted second random number and the decrypted personal authentication number from the personal ID device to the external system;

(h) decrypting the personal authentication number in the external system with the master key to determine the system key;

(i) decrypting and storing the second random number in the external system, using the system key as a key;

(j) generating a temporary cryptographic session key in the external system, using a predetermined combination of the first random number, the second random number, and the system key as a key;

(k) generating the same temporary session key with the processing means of the personal ID device, using a predetermined combination of the first random number, the second random number, and the system key as a key; and (l) using the temporary session key to encrypt and decrypt data thereafter exchanged between the personal ID device and the external system.

7. A method for transmitting data in a secure manner between an authorized user having a predetermined personal ID and an external electronic system, the external system having data processing means and a master key, comprising the steps of:

(a) providing a personal ID device comprising:
(1) an interface means for coupling the personal ID device to the external system to permit information exchange therebetween, (2) data entry means for accepting the personal ID from the user, (3) display means for visually transmitting information to the user, (4) data storage means having stored therein, and encrypted by the personal ID as a key, a predetermined system key and a predetermined personal authentication number, the personal authentication number comprising the system key encrypted using the master key as a key, (5) processing means coupled to the interface means, the data entry means, the display means, and the data storage means, having encrypting and decrypting functions and a random number generating function, for controlling the function of the personal ID card, and (6) a tamper-resistant housing enclosing at least the processing means and data storage means;

(b) connecting the personal ID device to the external system through the interface means;

(c) transmitting a first random number and a system ID from the external system to the storage means of the personal ID device;

(d) displaying the system ID to the user on the display means for user verification that the external system is one with which the user desires to exchange information;

(e) entering the user's personal ID into the processing means of the personal ID device through the data entry means;

(f) decrypting the system key and the personal authentication number with the processing means, using the personal ID as a key;

(g) generating a second random number in the personal ID device with the processing means;

(h) encrypting the second random number with the processing means, using the system key as a key;

(i) transmitting the encrypted second random number and the decrypted personal authentication number from the personal ID device to the external system;

(j) decrypting the personal authentication number in the external system with the master key to determine the system key;

(k) decrypting and storing the second random number in the external system, using the system key as a key;

(l) generating a temporary cryptographic session key in the external system, using a predetermined combination of the first random number, the second random number, and the personal authentication number as a key;

(m) generating the same temporary session key with the processing means of the personal ID device, using as a key a predetermined combination of the first random number, the second random number, and the personal authentication number; and (n) using the temporary session key to encrypt and decrypt data thereafter exchanged between the personal ID device and the external system.

8. The method of claim 6 or claim 7, comprising the further steps of:

(a) transmitting the first random number previously stored in the personal ID device to the external system, encrypted by the temporary session key;

(b) comparing the received first random number in the external system for equivalence with the first random number originally transmitted by the external system, to verify that the personal ID device has properly generated the temporary session key;

(c) transmitting the second random number stored in the external system to the personal ID device, encrypted by the temporary session key; and (d) comparing the received second random number for equivalence with the original second random number stored in the storage means, to verify that the external system has properly generated the temporary session key.

9. The method of claims 5, 6, or 7, further comprising the step of providing a new personal authentication number after the temporary session key is generated.

10. The method of claim 9, wherein the step of providing a new personal authentication number comprises the further steps of:

(a) generating and storing a new system key in the personal ID device, using a predetermined combination of the first random number, the second random number, and the system key;

(b) generating the same new system key in the external system, using a predetermined combination of the first random number, the second random number, and the system key;

(c) generating a new personal authentication number in the external system by encrypting the new system key using the master key as a key; and (d) transmitting the new personal authentication number from the external system to the personal ID device.

11. The method of claims 5, 6, or 7, wherein the user has a predetermined personal ID, the personal ID device further comprises data entry means, coupled to the processing means, for accepting the personal ID from the user, and the data stored in the data storage means is encrypted using the personal ID as a key, comprising the further steps of:
(a) entering the user's personal ID into the processing means of the personal ID device through the data entry means; and
(b) decrypting the data from the storage means with the processing means, using the personal ID as a key, after the data is accessed.

12. The method of claim 11, comprising the further step of deleting the personal ID from the personal ID device.

13. The method of claims 5, 6, or 7, wherein the external system has a system ID, and the personal ID device further comprises display means coupled to the processing means for visually transmitting information to the user, comprising the further steps of:
(a) transmitting the system ID from the external system to the personal ID device; and
(b) displaying the system ID to the user on the display means for user verification that the external system is one with which the user desires to exchange information.

14. The method of claim 13 comprising the further step of visually indicating to the user with the display means that the transmission of data has been successfully completed.

15. A method for transmitting financial data in a secure manner between an authorized user and an external electronic system, the external system having data processing means, comprising the steps of:
(a) providing a personal ID device comprising:
(1) an interface means for coupling the personal ID device to the external system to permit information exchange therebetween, (2) data storage means having stored therein data including a previous account balance, a next-check number, and an account key, (3) processing means coupled to the interface means and the data storage means, for controlling the function of the personal ID card, and (4) a tamper-resistant housing enclosing at least the processing means and data storage means;
(b) connecting the personal ID device to the external system through the interface means;
(c) transmitting from the external system to the personal ID device transaction information including an amount of payment required;
(d) accessing the previous account balance data, the next-check number, and the account key stored in the storage means;
(e) debiting the previous account balance by the transaction amount received from the external system;
(f) storing the new account balance in the storage means; and
(g) transmitting from the personal ID device to the external system the debit amount and the next-check number for the transaction.

16. The method of claim 15, wherein the external system has a system ID and transaction data, and the personal ID device further comprises display means coupled to the processing means for visually transmitting information to the user, comprising the further steps of:
(a) transmitting the system ID and the transaction data from the external system to the personal ID device; and
(b) displaying the system ID and the transaction data to the user on the display means for user verification that the system is one with which the user desires to exchange information, and that the transaction is one which the user desires to complete.

17. The method of claim 15 or claim 16, wherein the user has a predetermined personal ID, the personal ID device further comprises data entry means, coupled to the processing means, for accepting the personal ID from the user, and the data stored in the data storage means is encrypted using the personal ID as a key, comprising the further steps of:
(a) entering the user's personal ID into the processing means of the personal ID device through the data entry means to approve a transaction; and
(b) decrypting the data from the storage means with the processing means, using the personal ID as a key, after the data is accessed.

18. The method of claim 17, wherein the storage means contains a personal key and an account key encrypted by the personal ID, and wherein the transaction information includes a transaction description, comprising the further steps of:
(a) decrypting the personal key and account key using the personal ID as a key;
(b) encrypting the transaction description with the personal key;
(c) encrypting the transaction amount, the next-check number, and the encrypted transaction description using the account key; and
(d) transmitting the encrypted transaction amount, the next-check number, and the transaction description from the personal ID device to the external system.

19. A method for transmitting financial data in a secure manner between an authorized user and an external electronic system, the external system having data processing means and an account key, comprising the steps of:
(a) providing a personal ID device comprising:
(1) an interface means for coupling the personal ID device to the external system to permit information exchange therebetween, (2) data storage means having stored therein data including a previous account balance, a next-deposit number, and an account key, (3) processing means coupled to the interface means and the data storage means, for controlling the function of the personal ID card, and (4) a tamper-resistant housing enclosing at least the processing means and data storage means;
(b) connecting the personal ID device to the external system through the interface means;
(c) transmitting from the external system to the personal ID device transaction information including a deposit amount, and, encrypted by the account key, a deposit number and the deposit amount;
(d) accessing the previous account balance data, next-deposit number, and account key stored in the storage means;
(e) decrypting the encrypted deposit number and deposit amount, as received from the external system, using the account key as a key;
(f) comparing for equivalence the decrypted next-deposit number from the storage means with the decrypted deposit number, and the unencrypted deposit amount with the decrypted deposit amount from the external system;

(g) crediting the previous account balance with the deposit amount received from the external system, and incrementing the next-deposit number;

(h) storing the new account balance and the new next-deposit number in the storage means; and (i) transmitting the new account balance from the personal ID device to the external system for verification by the external system that the personal ID device has received the correct deposit amount.

20. The method of claim 59, wherein the external system has a system ID and transaction data, and the personal ID device further comprises display menas, coupling to the processing means, for visually transmitting information to the user, comprising the further steps of:

(a) transmitting the system ID and the transaction data from the external system to the personal ID device; and (b) displaying the system ID and the transaction data to the user on the display means for user verification that the system is one with which the user desires to exchange information, and that the transaction is one which the user desires to complete.

21. The method of claim 20, wherein the user has a predetermined personal ID, the personal ID device further comprises data entry means, coupled to the processing means, for accepting the personal ID from the user, and the data stored in the data storage means is encrypted using the personal ID as a key, comprising the further steps of:

(a) entering the user's personal ID into the processing means of the personal ID device through the data entry means to approve a transaction; and (b) decrypting the data from the storage means with the processing means, using the personal ID as a key, after the data is accessed.

* * * * *